United States Patent
Wang et al.

(10) Patent No.: US 6,255,415 B1
(45) Date of Patent: Jul. 3, 2001

(54) ETHYLENE POLYMERIZATION PROCESS

(75) Inventors: Shaotian Wang; Jia-Chu Liu, both of Mason; Mark P. Mack, West Chester, all of OH (US); Clifford C. Lee, Houston, TX (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/515,839

(22) Filed: Feb. 29, 2000

(51) Int. Cl.$^7$ .................................. C08F 2/34; C08F 4/52
(52) U.S. Cl. .......................... 526/132; 526/129; 526/134; 526/160; 526/161; 526/172; 526/943; 502/117
(58) Field of Search ..................... 526/132, 134, 526/161, 172

(56) References Cited

U.S. PATENT DOCUMENTS

| | | | |
|---|---|---|---|
| 4,404,344 | 9/1983 | Sinn et al. ........................... | 526/160 |
| 4,431,788 | 2/1984 | Kaminsky ........................... | 527/313 |
| 5,064,802 | 11/1991 | Stevens et al. ..................... | 502/155 |
| 5,539,124 | * 7/1996 | Etherton et al. .................... | 548/402 |
| 5,554,775 | * 9/1996 | Krishnamurty et al. ............. | 556/7 |
| 5,599,761 | 2/1997 | Turner ................................ | 502/152 |
| 5,637,660 | * 6/1997 | Nagy et al. .......................... | 526/160 |
| 5,744,417 | 4/1998 | Nagy et al. .......................... | 502/155 |
| 5,747,404 | 5/1998 | Nagy et al. .......................... | 502/104 |
| 5,756,611 | * 5/1998 | Etherton et al. .................... | 526/127 |
| 5,859,157 | 1/1999 | Gupte et al. ........................ | 526/88 |
| 6,204,216 | * 3/2001 | Nagy et al. .......................... | 502/103 |

* cited by examiner

Primary Examiner—David W. Wu
Assistant Examiner—R. Rabago
(74) Attorney, Agent, or Firm—Shao Guo

(57) ABSTRACT

A gas phase copolymerization of ethylene is disclosed. The process uses a supported single-site catalyst that contains a heteroatomic ligand and produces polyethylene that has a reduced density. Suitable heteroatomic ligands include boraaryl, azaborolinyl, pyridinyl, pyrrolyl, indolyl, carbazolyl and quinolinyl.

8 Claims, No Drawings

ETHYLENE POLYMERIZATION PROCESS

FIELD OF THE INVENTION

The invention relates to an ethylene polymerization process. More particularly, the invention relates to a gas phase polymerization of ethylene with a single-site catalyst. The process produces polyethylene having a reduced density.

BACKGROUND OF THE INVENTION

Linear low density polyethylene (LLDPE), which has a density from 0.916 to 0.940 g/mL, has penetrated all traditional markets for polyethylene, including film, molding, pipe, and wire and cable. Due to its strength and toughness, LLDPE has been largely used in the film market, such as produce bags, shopping bags, garbage bags, diaper liners, and stretch wrap. LLDPE has been primarily made with conventional Ziegler catalysts. It is typically produced by copolymerization of ethylene with a long chain $\alpha$-olefin such as 1-butene, 1-hexene, or 1-octene.

In the early 1980's, Kaminsky discovered a new class of olefin polymerization catalysts known as metallocenes (see U.S. Pat. Nos. 4,404,344 and 4,431,788). A metallocene catalyst consists of a transition metal compound that has one or more cyclopentadienyl (Cp) ligands. Unlike Ziegler catalysts, metallocene catalysts are usually soluble in olefins or polymerization solvents and give homogeneous polymerization systems. Since these catalysts have a single reactive site (compared with multiple reactive sites of Ziegler catalysts), they are also called "single-site" catalysts. Metallocene catalysts are more reactive than conventional Ziegler catalysts, and they produce polymers with narrower molecular weight distributions. Because single-site catalysts enhance incorporation of long chain $\alpha$-olefin comonomers into polyethylene, they are of particular interest in the production of LLDPE.

Over the last decade, non-metallocene single-site catalysts have also been developed rapidly. Non-metallocene single-site catalysts contain non-Cp ligands, which are usually heteroatomic ligands, e.g., boraaryl, azaborolinyl, pyridinyl, pyrrolyl, indolyl, carbazolyl, or quinolinyl groups. The development of non-metallocene single-site catalysts has provided the polyolefin industry with more choices of catalysts and opportunities for optimizing the products or production processes.

Non-metallocene single-site catalysts have most of the characteristics of metallocene catalysts, including high activity. However, they produce polyethylenes that have relatively high density. For example, boraaryl-based single-site catalysts produce polyethylenes that have densities from about 0.93 to about 0.97 g/mL (see U.S. Pat. No. 5,554,775). It is of significant interest to further lower the density of the polyethylenes produced with non-metallocene single-site catalysts.

SUMMARY OF THE INVENTION

The invention is a gas phase polymerization process for making ethylene polymers, particularly polymers that have reduced densities. The process uses a single-site catalyst containing at least one heteroatomic ligand. The process comprises two steps: 1) supporting the single-site catalyst; and 2) polymerizing ethylene in gas phase over the catalyst.

We have surprisingly found that the gas phase process of the invention significantly increases the incorporation of $\alpha$-olefin into polyethylene and lowers the polyethylene density compared to slurry phase process. Using the gas phase process of the invention, we have successfully prepared ethylene polymers that have densities similar to those prepared with metallocene single-site catalysts.

DETAILED DESCRIPTION OF THE INVENTION

The invention is a gas phase polymerization process for preparing a linear low density polyethylene that has a density within the range from about 0.890 to 0.930 g/mL. The process includes supporting a single-site catalyst. The single-site catalysts suitable for use in the invention are organometallic compounds having a heteroatomic ligand. Suitable metals are Group 3–10 transition or lanthanide metals. Preferably, the metal is titanium, zirconium, or hafnium. Zirconium is particularly preferred. Suitable heteroatomic ligands include substituted or non-substituted boraaryl, azaborolinyl, pyridinyl, pyrrolyl, indolyl, carbazolyl, and quinolinyl, and the like. Preferred heteroatomic ligands are boraaryl and quinolinyl.

In addition to a heteroatomic ligand, other ligands are used. The total number of ligands satisfies the valence of the transition metal. The ligands can be bridged or non-bridged. Other suitable ligands include substituted or non-substituted cyclopentadienyls, indenyls, fluorenyls, halides, $C_1$–$C_{10}$ alkyls, $C_6$–$C_{15}$ aryls, $C_7$–$C_{20}$ aralkyls, dialkylamino, siloxy, alkoxy, and the like, and mixtures thereof. Cyclopentadienyls and indenyls are preferred.

Methods for preparing heteroatomic ligand-containing single-site catalysts are available in the literature. For example, U.S. Pat. Nos. 5,554,775, 5,539,124, 5,756,611, and 5,637,660, the teachings of which are herein incorporated by reference, teach how to make single-site catalysts that contain boraaryl, pyrrolyl, azaborolinyl, or quinolinyl ligands.

The single-site catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Preferably, the support has a surface area in the range of about 10 to about 700 $m^2$/g, a pore volume in the range of about 0.1 to about 4.0 mL/g, an average particle size in the range of about 10 to about 500 $\mu$m, and an average pore diameter in the range of about 10 to about 1000 Å. They are preferably modified by heat treatment, chemical modification, or both. For heat treatment, the support is preferably heated at a temperature from about 100° C. to about 800° C. Suitable chemical modifiers include organoaluminum, organosilicon, organomagnesium, and organoboron compounds.

The single-site catalysts are supported using any known techniques. For example, U.S. Pat. Nos. 5,747,404 and 5,744,417, the teachings of which are incorporated herein by reference, teach how to support single-site catalysts onto a polysiloxane or a silylamine polymer. In one suitable method, the single-site catalyst is dissolved in a solvent and combined with the support. Evaporation of the solvent gives a supported catalyst.

The catalyst is used with an activator. Activators can be either mixed with single-site catalysts and supported together on a support or added separately to the polymerization. Suitable activators include alumoxane compounds, alkyl aluminums, alkyl aluminum halides, anionic compounds of boron or aluminum, trialkylboron and triarylboron compounds, and the like. Examples are methyl alumoxane, ethyl alumoxane, triethylaluminum, trimethylaluminum, diethylaluminum chloride, lithium tetrakis(pentafluorophenyl) borate, triphenylcarbenium tetrakis(pentafluorophenyl) borate, lithium tetrakis (pentafluorophenyl) aluminate, tris(pentafluorophenyl) boron, tris(pentabromophenyl) boron, and the like. Other suitable activators are known, for example, in U.S. Pat. Nos. 5,756,611, 5,064,802, and 5,599,761, and their teachings are incorporated herein by reference.

Activators are generally used in an amount within the range of about 0.01 to about 100,000, preferably from about 0.1 to about 1,000, and most preferably from about 0.5 to about 300, moles per mole of the single-site catalyst.

The process of the invention includes polymerizing ethylene in the gas phase over the supported catalyst. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail a gas phase polymerization of ethylene with a Ziegler catalyst.

In one suitable method, the polymerization is conducted batchwise where ethylene is gradually fed into a reactor in which a supported single-site catalyst is dispersed in-situ. In another method, the polymerization is conducted continuously where both ethylene and a dispersed catalyst are continuously fed into a reactor, and polymer product is continuously withdrawn from the reactor.

The supported catalyst is preferably dispersed into a preformed polyethylene prior to polymerization. The dispersion process is preferably performed in-situ, i.e., a preformed polyethylene and the supported catalyst are added into the reactor in which polymerization takes place. The preformed polyethylene and the supported catalyst can be mixed by melting or by dissolving in a hydrocarbon solvent. When a solvent is used, it is removed from the catalyst before polymerization takes place. Preformed polyethylene can be prepared by Ziegler or single-site catalysts. The ratio of preformed polyethylene/supported single-site catalyst is preferably from about 100/1 to about 1,000,000/1.

The polymerization is preferably conducted under high pressure. The pressure is preferably in the range of about 150 to about 15,000 psi, more preferably from about 500 to about 5,000 psi, and most preferably from about 1,000 to about 2,000 psi. Generally, the higher the pressure, the more productive the process. Polymerization temperature is preferably within the range from 50° C. to 250° C., more preferably from 75° C. to 150° C.

Chain transfer agents such as hydrogen can be used to control the molecular weight of the product. The proportion of hydrogen used can be varied. For example, if less hydrogen is used, a higher molecular weight polymer will be produced.

Ethylene polymers made by the process include polyethylene and copolymers of ethylene with a $C_3$-$C_{10}$ α-olefin. Suitable α-lefins include propylene, 1-butene, 1-hexene, and 1-octene, and the like, and mixture thereof. The molar ratio of ethylene/α-olefin is within the range of about 85/15 to 95/5. The invention produces ethylene polymers having a density within the range from about 0.890 to about 0.930 g/mL, preferably 0.900 to 0.920 g/mL. The polymers are widely used in the industry for making polyethylene films, sheets, molded parts, and other products.

The following examples merely illustrate the invention. Those skilled in the art will recognize many variations that are within the spirit of the invention and scope of the claims.

EXAMPLE 1

Gas Phase Polymerization with Quinolinoxy-Based Single-Site Catalyst

Preparation of (8-Quinolinoxyl)TiCl$_3$

8-Quinolinol powder (1.45g, 10 mmol) is added into a flask, stirred, and purged with nitrogen at 25° C. for 10 minutes. Heptane (100 mL) is then added into the flask. The reactor contents are stirred at 40° C. with nitrogen flow for 20 minutes. Titanium tetrachloride (TiCl4) solution in heptane (10 mL, 1.0 mole/L) is added dropwise into the flask over 30 minutes. Additional heptane (100 mL) is then added to the reaction mixture and stirred at 25° C. with nitrogen flow for 4 hours. Stirring is discontinued and the reaction mixture is settled overnight. A light-red solid is formed and precipitated from the solution. The solid is isolated by decanting the solvents.

Preparation of (8-Quinolinoxy)Ti(CH$_2$—Ph)$_3$

Ethylene dichloride (100 mL) is added into the solid prepared above in a flask. The reactor contents are stirred, and purged with nitrogen at 25° C. for 30 minutes. Benzylmagnesium chloride (Cl—Mg—CH$_2$—Ph) solution in diethyl ether (1.0 mole/L, 30 mL) is added dropwise into the flask over 7 hours with stirring at 25° C. The solvent is removed by distillation, yielding the catalyst complex (8-Quinolinoxyl)Ti(CH$_2$—Ph)$_3$.

Supporting The Catalyst Onto Silica

Silica (1.0 g, Silica 948, product of Davison Chemical Company) is modified with hexamethyl disilazane (HMDS), aged for 3 weeks, and then calcined at 600° C. for 4 hours. Heptane (5 mL), dibutyl magnisium (0.6 mmol) and the catalyst (8-quinolinoxyl)Ti(CH$_2$—Ph)$_3$ (0.2 mmol) are mixed and added into the treated silica with stirring in a flask at 25° C. for 30 minutes, resulting in a purple slurry. The solvent is then removed at 43° C. by nitrogen purge and the solid then dried under vacuum for 15 minutes, yielding silica-supported (8-quinolinoxyl)Ti(CH$_2$—Ph)$_3$ catalyst (1.1 g).

Gas Phase Polymerization of Ethylene

The polymerization is conducted in a batch reactor. Th supported catalyst prepared above (0.6 g), triethylaluminum (TEAL, co-catalyst, 2.7 mL, 1.0 mole/L in heptane), and LLDPE (200 g) are charged into a two-liter stainless steel reactor. The reactor contents are heated to 75° C. with agitation for 30 minutes to disperse the catalyst. The reactor is pressured with ethylene (100 psi), hydrogen (20 psi), and nitrogen (180 psi). 1-Hexene (6 mL) is gradually added into the reactor during the course of polymerization. The polymerization is carried out at 75° C. for 4 hours, and then terminated by cooling the reactor contents to 25° C. About 800 grams of polymer is produced, and 200 grams of it is used for the next batch. The polyethylene of the fourth batch has a density of 0.918 g/mL.

Comparative Example 2

Slurry Phase Polymerization with Quinolinoxyl Based Single-Site Catalyst

The procedure of example 1 is repeated but the polymerization is conducted in a slurry phase. The supported catalyst prepared in Example 1 (0.6 g), TEAL (2.7 mL,1.0 mole/L in heptane), and isobutane (200 mL) are charged into the reactor. The reactor is pressured with ethylene (100 psi), hydrogen (20 psi), and nitrogen (180 psi). 1-Hexene (6 mL) is gradually added into the reactor during the course of polymerization. The polymerization is carried out at 75° C. for 4 hours. The polyethylene has a density of 0.941 g/mL.

EXAMPLE 3

Gas Phase Polymerization with Borabenzene Based Single-Site Catalyst

Preparation of Supported Catalyst (1-Methylboratabenzene) (cyclopentadienyl) zirconium dichloride (10.4 g) and trityl tetrakis (pentafluorophenyl) borate (40.2 g) are dissolved in dry toluene (314 g). The solution is added dropwise to the silica (363 g, treated as in Example 1) under nitrogen protection with stirring at 25° C. for one hour. The solvent is removed by nitrogen purge and then dried under vacuum at 40° C., yielding the supported catalyst (385 g). The supported catalyst is a free-flowing orange-yellow powder with 2.5% by weight of the borabenzene catalyst complex and 9.7% by weight of borate activator.

Gas Phase Polymerization

Polymerization is performed in a 2L stainless steel batch reactor. The supported catalyst prepared above (0.535 g), TEAL (1.5 mL, 1.0 mole/L in heptane), and polyethylene (157 g, prepared by slurry phase polymerization, having a density of 0.948 g/mL and recurring unit of 1-hexene 4.3% by weight) are charged into the reactor. The reactor contents are heated at 82° C. for 30 minutes to disperse the catalyst. The reactor is then pressured with ethylene (194 psi), hydrogen (17 psi) and nitrogen (165 psi). 1-Hexene (45 mL) is gradually added into the reactor during the course of polymerization. The polymerization is carried out at 82° C. for 4 hours and then terminated by cooling the reaction mixture to 25° C. About 440 grams of polymer is collected which has a density of 0.932 g/mL and contains 7.9% by weight of recurring unit of 1-hexene.

Comparative Example 4

Slurry Phase Polymerization with Borabenzene Based Single-Site Catalyst

The procedure of Example 3 is repeated but the polymerization is conducted in a slurry phase in a 1 L stainless steel reactor. The supported catalyst prepared in Example 3 (0.268 g), TEAL (0.5 mL, 1.0 mole/L in heptane), and isobutane (350 mL) are charged into the reactor. The reactor is pressured with ethylene (194 psi), hydrogen (17 psi) and nitrogen (165 psi). 1-Hexene (21 mL) is gradually added into the reactor during the course of polymerization. The polymerization is carried out at 82° C. for 4 hours. The polyethylene has a density of 0.941 g/mL.

The preceding examples are meant only as illustrations; the following claims define the scope of the invention.

We claim:
1. A process which comprises:
   (a) supporting a catalyst comprising
       i) a transition metal compound that contains at least one heteroatomic ligand selected from the group consisting of boraaryl, azaborolinyl, pyridinyl, pyrrolyl, indolyl, carbazolyl, and quinolinyl; and
       ii) an optional activator onto a support selected from the group consisting of inorganic oxides and chlorides, and organic polymer resins; and
   (b) polymerizing an olefin mixture that comprises:
       i) from 85 to 95 mole % of ethylene; and
       ii) from 5 to 15 mole % of a $C_3$–$C_{10}$ α-olefin over the catalyst in the gas phase;
   wherein the polymer produced has a density within the range of about 0.890 to about 0.930 g/mL.

2. The process of claim 1 wherein the polymerization temperature is within the range of about 50° C. to about 250° C.

3. The process of claim 1 wherein the $C_3$–$C_{10}$ α-olefin is selected from the group consisting of propylene, 1-butene, 1-pentene, 1-hexene, 1-octene, and mixtures thereof.

4. The process of claim 1 wherein the activator is selected from the group consisting of alumoxanes, alkyl aluminums, alkyl aluminum halides, anionic compounds of boron or aluminum, trialkylboron compounds, and triarylboron compounds.

5. The process of claim 1 wherein the process is performed at a pressure within the range of about 500 psi to about 5,000 psi.

6. The process of claim 1 wherein the heteroatomic ligand is quinolinyl.

7. The process of claim 1 wherein the heteroatomic ligand is boraaryl.

8. The process of claim 1 wherein the polymer produced has a density within the range of about 0.900 to about 0.920 g/mL.

* * * * *